United States Patent
Huang et al.

(10) Patent No.: US 12,525,786 B2
(45) Date of Patent: Jan. 13, 2026

(54) CONTROL METHOD, DEVICE, SYSTEM AND STORAGE MEDIUM

(71) Applicants: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

(72) Inventors: Zhenghui Huang, Foshan (CN); Tan Long, Foshan (CN); Xianshi Wen, Foshan (CN); Dong Wei, Foshan (CN); Ming Zhao, Foshan (CN)

(73) Assignees: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 318 days.

(21) Appl. No.: 18/289,529

(22) PCT Filed: May 7, 2022

(86) PCT No.: PCT/CN2022/091402
§ 371 (c)(1),
(2) Date: Nov. 3, 2023

(87) PCT Pub. No.: WO2022/237674
PCT Pub. Date: Nov. 17, 2022

(65) Prior Publication Data
US 2024/0235178 A1    Jul. 11, 2024

(30) Foreign Application Priority Data
May 12, 2021   (CN) .......................... 202110517405.2

(51) Int. Cl.
*H02H 3/20* (2006.01)
*H02H 1/00* (2006.01)
*H02M 7/217* (2006.01)

(52) U.S. Cl.
CPC ............ *H02H 3/20* (2013.01); *H02H 1/0007* (2013.01); *H02M 7/217* (2013.01)

(58) Field of Classification Search
CPC .......... H02H 3/20; H02H 1/0007; H02H 7/16; H02M 7/217; H02M 1/009; H02M 1/4216;
(Continued)

(56) References Cited

U.S. PATENT DOCUMENTS 5,663,858 A * 9/1997 Etter ................... H01L 25/0655
  361/28
5,805,394 A * 9/1998 Glennon .................. H02H 7/06
  361/30

(Continued)

FOREIGN PATENT DOCUMENTS

CN       103837827 A     6/2014
CN       104253554 A    12/2014
(Continued)

OTHER PUBLICATIONS

Huang Zhaobin; Electronic circuit and air conditioner; Date: Jan. 5, 2021; Entire specification and figures (Year: 2021).*
(Continued)

*Primary Examiner* — Dharti H Patel
(74) *Attorney, Agent, or Firm* — Anova Law Group, PLLC (57) ABSTRACT

A control method includes, in response to detecting a target-type fault, determining, by a first control device managing a three-phase three-level power supply circuit, a control signal for instructing a first load to stop operating.

(Continued)

The first load is connected to one of buses of the three-phase three-level power supply circuit, and the target-type fault is correlated with a second load connected to two of the buses of the three-phase three-level power supply circuit. The method further includes sending the control signal to a second control device via a target communication channel, to instruct the second control device to control the first load to stop operating.

20 Claims, 6 Drawing Sheets

(58) Field of Classification Search
CPC ........ H02M 7/487; H02M 1/32; H02M 1/088; H02J 9/062
USPC ........................................................ 361/91.1
See application file for complete search history.

(56) References Cited

U.S. PATENT DOCUMENTS

| | | | |
|---|---|---|---|
| 8,269,451 B2* | 9/2012 | Kitanaka | B60L 3/0023 318/434 |
| 8,570,779 B2* | 10/2013 | Dommaschk | H02M 7/49 361/57 |
| 9,025,350 B2* | 5/2015 | Gan | H02M 7/49 363/56.05 |
| 11,228,243 B2* | 1/2022 | Petersen | H02M 1/088 |
| 2001/0022736 A1* | 9/2001 | Suzuki | H02M 1/4233 363/69 |
| 2011/0050154 A1* | 3/2011 | Farr | H02H 3/006 361/30 |
| 2011/0227522 A1* | 9/2011 | Shinomoto | H02M 1/4225 318/400.29 |
| 2014/0347898 A1 | 11/2014 | Raju et al. | |
| 2014/0369100 A1* | 12/2014 | Yamada | H02M 7/12 363/125 |
| 2015/0349521 A1* | 12/2015 | Liu | H02M 7/487 361/93.1 |
| 2016/0036216 A1* | 2/2016 | Colombi | H02J 9/061 361/93.9 |
| 2016/0187409 A1* | 6/2016 | Kolker | H02H 1/0015 361/42 |
| 2019/0334445 A1* | 10/2019 | Ishikawa | H02M 7/48 |
| 2020/0400754 A1* | 12/2020 | Hotta | H02M 1/143 |
| 2024/0235178 A1* | 7/2024 | Huang | H02J 9/062 |
| 2025/0132563 A1* | 4/2025 | Hu | H02M 7/06 |

FOREIGN PATENT DOCUMENTS

| | | | | |
|---|---|---|---|---|
| CN | 107499159 | A | 12/2017 | |
| CN | 210720695 | U | 6/2020 | |
| CN | 112271700 | A | 1/2021 | |
| CN | 212305171 | U | 1/2021 | |
| CN | 117937918 | A * | 4/2024 | .......... H02M 1/4233 |
| EP | 2023476 | A2 * | 2/2009 | ............ H02M 7/219 |
| JP | 2013255317 | A | 12/2013 | |
| KR | 101502578 | B1 | 3/2015 | |

OTHER PUBLICATIONS

The European Patent Office (EPO) Extended Search Report for EP Application No. 22806640.3 Sep. 24, 2024 9 Pages.
Wenlong Ding et al., "Independent Voltage Outputs Control for VIENNA Rectifier Considering Multiple Loads Situations", 2017 IEEE 3rd International Future Energy Electronics Conference and ECCE Asia, Jun. 3, 2017, pp. 1785-1790.
The World Intellectual Property Organization (WIPO) International Search Report for PCT/CN2022/091402 Jul. 15, 2022 12 pages (including English translation).
The China National Intellectual Property Administration (CNIPA) The First Office Action for Chinese Application 202110517405.2 Mar. 5, 2025 11 Pages (With Translation).

* cited by examiner

FIG. 5 determining a first control signal for instructing the first load connected to the three-phase three-level power supply circuit to stop operating in response to that a shutdown fault of the second load and/or an over-voltage fault of the first capacitor is detected — 401 in response to that the first control signal is in a form of a data frame, sending the first control signal to the second control device via the target communication channel according to a preset time interval — 402

FIG. 11

CONTROL METHOD, DEVICE, SYSTEM AND STORAGE MEDIUM

CROSS-REFERENCE TO RELATED APPLICATIONS

This application is a National Stage Entry under 35 U.S.C. § 371 of International Application No. PCT/CN2022/091402, filed on May 7, 2022, which claims priority to Chinese patent application Ser. No. 202110517405.2, filed on May 12, 2021, the entire contents of both of which are incorporated herein by reference.

TECHNICAL FIELD

The present application relates to the technical field of power supply detection, and in particular to a control method, a control device, a control system and a storage medium.

BACKGROUND

In three-phase power supply applications such as air-conditioning systems, the three-phase power supply circuit can provide operating voltage for inverter compressors by means of full-bus loads and for direct current (DC) fans by means of half-bus loads. When the full-bus load and the half-bus load are working, if the full-bus load suddenly fails, since the half-bus load cannot be controlled in time to stop working, a serious shift will occur in the mid-point potential of the capacitor in the working circuit, causing the capacitor to be prone to over-voltage phenomenon, which will further cause damage to the storage capacitor.

At present, there is no reliable and effective control method for the above situation, which leads to the current lower control efficiency and the higher fault rate of the power supply control circuit.

SUMMARY

In order to solve the above technical problems, embodiments of the present application aim to provide a control method, circuit, system and device, which solve the current problem of being unable to quickly and timely control the half-bus load to stop operating when the full-bus load suddenly fails, and realizes a control method of quickly and timely controlling the half-bus load to stop operating, such that the probability of damage to the storage capacitor in the three-phase power supply circuit due to the over-voltage phenomenon is effectively reduced, the control efficiency of the three-phase four-wire power supply circuit is improved, and the fault rate of the power supply control circuit is reduced.

The technical solution of the present application is realized as below:

A first aspect provides a control method, the control method is applied to a first control device for managing a three-phase three-level power supply circuit, including:
in response to detecting a target-type fault, determining a first control signal for instructing a first load connected to the three-phase three-level power supply circuit to stop operating, the first load is connected to one bus of the three-phase three-level power supply circuit, and the target-type fault has a correlation with a second load connected to two buses of the three-phase three-level power supply circuit; and
sending the first control signal to a second control device via a target communication channel, the first control signal is configured to instruct the second control device to control the first load to stop operating.

A second aspect provides a first control device, the first control device includes: a processor and a target communication channel, wherein:
the processor is configured for performing following steps:
in response to detecting a target-type fault, determining a first control signal for instructing a first load connected to the three-phase three-level power supply circuit to stop operating;
the first load is connected to one bus of the three-phase three-level power supply circuit, and the target-type fault has a correlation with a second load connected to two buses of the three-phase three-level power supply circuit;
the target communication channel is configured for communicating with a second control device to transmit the first control signal to the second control device;
the first control signal is configured to instruct the second control device to control the second load to stop operating.

A third aspect provides a control system, the system includes: a three-phase three-level power supply circuit, a first load, a second load, a first control device and a second control device; wherein:
the three-phase three-level power supply circuit is configured for rectifying an input alternating current signal to obtain a direct current signal and providing a working power supply for the first load connected to one bus of the three-phase three-level power supply circuit, the second load connected to two buses of the three-phase three-level power supply circuit, the first control device and the second control device;
the first control device is configured for monitoring the three-phase three-level power supply circuit and the first load to implement any one of the control methods as mentioned above; and
the second control device is configured for managing and controlling the second load.

A fourth aspect provides an air conditioning device, the air conditioning device includes a control system as mentioned above; the first load is a direct current fan load and the second load is a compressor load.

A fifth aspect provides a storage medium, on which a control program is stored, the control program when executed by a processor implements any one of the control methods as mentioned above.

In an embodiment of the present application, the first control device determines a first control signal for instructing the first load connected to the three-phase three-level power supply circuit to stop operating when a target-type fault is detected, and sends the first control signal to the second control device via the target communication channel. In this way, the first control device sends the first control signal for instructing the first load to stop operating to the second control device via the target communication channel, so as to cause the second control device to control the first load to stop operating, thereby solving the current problem of unable to quickly and timely control the half-bus load to stop operating when the full-bus load suddenly fails, and realizing a control method of quickly and timely controlling the half-bus load to stop operating, such that the probability of damage of the storage capacitor in the three-phase power supply circuit due to the over-voltage phenomenon is effectively reduced, the control efficiency of the three-phase four-wire power supply circuit is improved, and the fault rate of the power supply control circuit is reduced.

DETAILED DESCRIPTION OF THE EMBODIMENTS

In order to make the purpose, technical solutions and advantages of the present application clearer, the present application will be described in further detail below in conjunction with the accompanying drawings, and the described embodiments shall not be regarded as limitations of the present application, and all other embodiments obtained by those skilled in the art without making creative labor fall within the scope of the present application.

Unless otherwise defined, all technical and scientific terms used herein have the same meaning as commonly understood by those skilled in the art. The terms used herein are for the purpose of describing embodiments of the present application only and are not intended to limit the present application.

Figure 1:
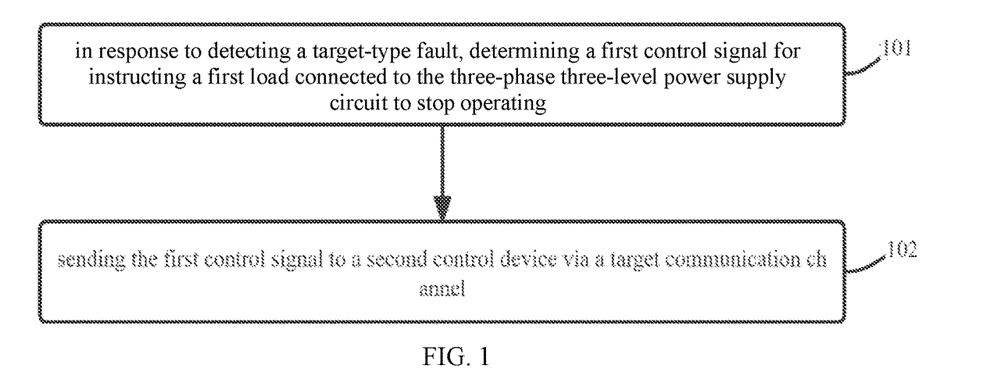
FIG. 1 is a first flowchart of a control method according to an embodiment of the present application.

Embodiments of the present application provide a control method, and as shown in FIG. 1, the method is applied to a first control device for managing a three-phase three-level power supply circuit, the method includes:

Step 101, in response to detecting a target-type fault, determining a first control signal for instructing a first load connected to the three-phase three-level power supply circuit to stop operating.

The first load is connected to one bus of the three-phase three-level power supply circuit, and the target-type fault has a correlation with a second load connected to two buses of the three-phase three-level power supply circuit.

In the embodiment of the present application, the target-type fault refers to a fault that would cause over-voltage or damage to an energy storage capacitor in the three-phase three-level power supply circuit. The first load may refer to a half-bus load, i.e., the first load is supplied with operating power from one bus in the three-phase three-level power supply circuit. A first control signal for controlling the first load to stop operating is generated immediately when the target-type fault is detected.

Step 102: sending the first control signal to a second control device via a target communication channel.

The first control signal is configured to instruct the second control device to control the first load to stop operating.

In the embodiment of the present application, the target communication channel is a specific channel for sending the first control signal, which may be the original communication channel between the first control device and the second control device, or may be a dedicated communication channel for sending the first control signal. In this way, the second control device receives the first control signal and controls the first load to stop operating in response to the first control signal.

In an embodiment of the present application, the first control device determines a first control signal for instructing the first load connected to the three-phase three-level power supply circuit to stop operating when a target-type fault is detected, and sends the first control signal to the second control device via the target communication channel. In this way, the first control device sends the first control signal for instructing the first load to stop operating to the second control device via the target communication channel, so as to cause the second control device to control the first load to stop operating, thereby solving the current problem of unable to quickly and timely control the half-bus load to stop operating when the full-bus load suddenly fails, and realizing a control method of quickly and timely controlling the half-bus load to stop operating, such that the probability of damage of the storage capacitor in the three-phase power supply circuit due to the over-voltage phenomenon is effectively reduced, the control efficiency of the three-phase four-wire power supply circuit is improved, and the fault rate of the power supply control circuit is reduced.

Figure 2:
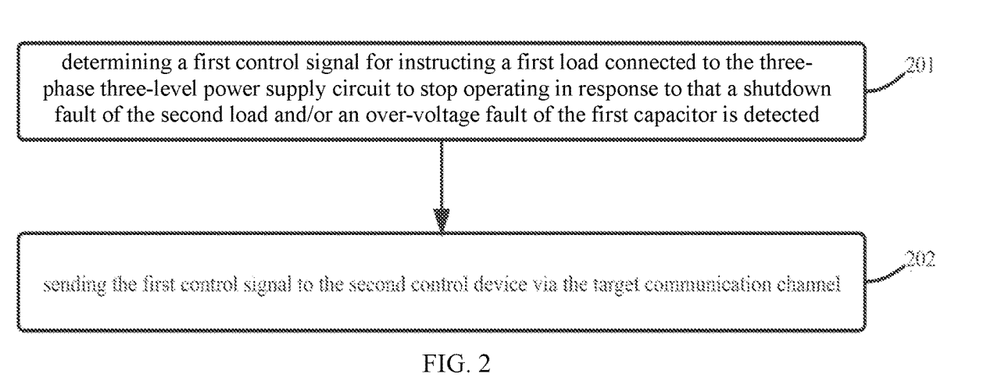
FIG. 2 is a second flowchart of a control method according to an embodiment of the present application.

Based on the foregoing embodiment, the embodiment of the present application provides a control method, and as shown in FIG. 2, the method is applied to a first control device for managing a three-phase three-level power supply circuit, and the method includes:

Step 201, determining a first control signal for instructing a first load connected to the three-phase three-level power supply circuit to stop operating in response to that a shutdown fault of the second load and/or an over-voltage fault of the first capacitor is detected.

The first load is connected to one bus of the three-phase three-level power supply circuit, the target-type fault has an association with the second load connected to two buses of the three-phase three-level power supply circuit, and the first capacitor is an energy storage capacitor in the three-phase three-level power supply circuit in addition to the second capacitor connected in parallel with the first load.

In the embodiment of the present application, the shutdown fault of the second load refers to that the second load has a sudden shutdown during normal operation, and the over-voltage fault of the first capacitor refers to a situation in which the voltage of the first capacitor is higher than the maximum withstand range of the first capacitor. Since the occurrence of the shutdown fault of the first load and/or the over-voltage fault of the first capacitor will lead to such as over-voltage or damage of the second capacitor, therefore, in order to protect the second capacitor, it is necessary to control the first load connected in parallel with the second capacitor to quickly stop operating, and thus cause the first load to stop consuming the voltage corresponding to the second capacitor, so as to ensure that the second capacitor does not experience an over-voltage or damage.

Step 202: sending the first control signal to the second control device via the target communication channel.

The first control signal is configured to instruct the second control device to control the first load to stop operating.

In an embodiment of the present application, the first control device quickly sends the generated first control signal to the second control device via the target communication channel between the first control device and the second control device, so that the second control device quickly responds to the first control signal to control the first load to stop operating.

It should be noted that the target communication channel includes a wired communication channel or a wireless communication channel. The wireless communication channel may be realized by setting a matching wireless communication module in the first control device and the second control device.

Figure 3:
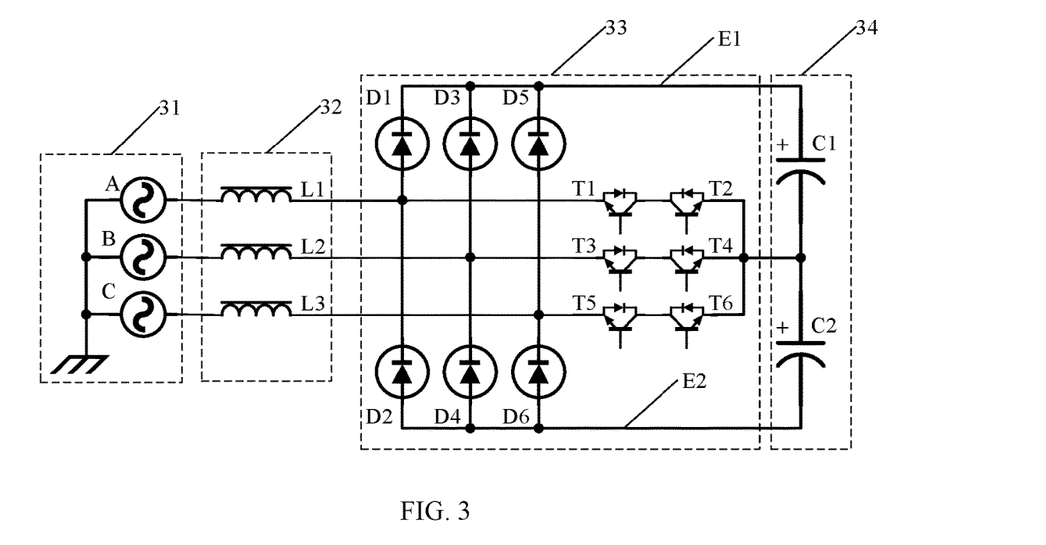
FIG. 3 is a schematic diagram of a three-phase three-level power supply circuit according to an embodiment of the present application.

Based on the foregoing embodiment, the circuit diagram of the three-phase three-level power supply circuit can be referred to as shown in FIG. 3, specifically including: an alternating current (AC) input terminal 31, an inductor module 32, a rectifier module 33, and an energy storage module 34. The AC input terminal 31 includes: a first-phase AC input terminal A, a second-phase AC input terminal B, and a third-phase AC input terminal C, and the AC input terminal 31 connects to an externally input AC utility power; the inductor module 32 includes: three inductors L1, L2, and L3; the rectifier module 33 includes: six diodes D1, D2, D3, D4, D5, and D6, and six bi-directional switching tubes T1, T2, T3, T4, T5, and T6; and the energy storage module 34 includes: two capacitors C1 and C2; and the bus E1 and the bus E2. The inductor module 32 transmits an AC voltage signal inputted from the AC input terminal 31 to the rectifier module 33, and the rectifier module 33 rectifies the received AC voltage signal to obtain a DC signal, and the DC signal is stored in the energy storage module 34.

Figure 4:
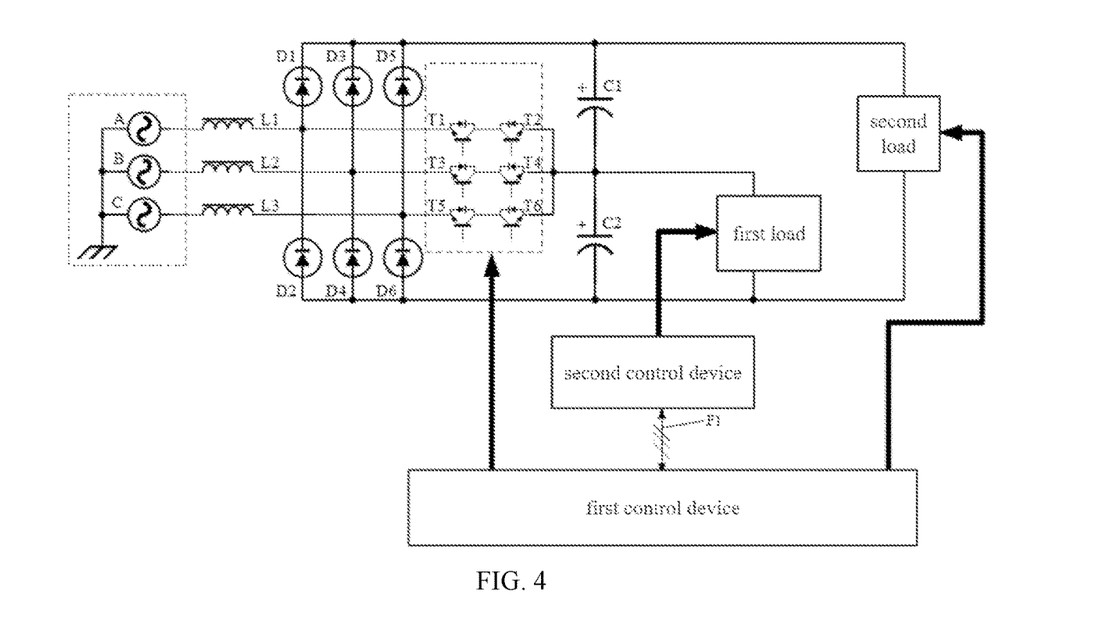
FIG. 4 is a schematic diagram of a circuit connection of a control system according to an embodiment of the present application.
Figure 5:
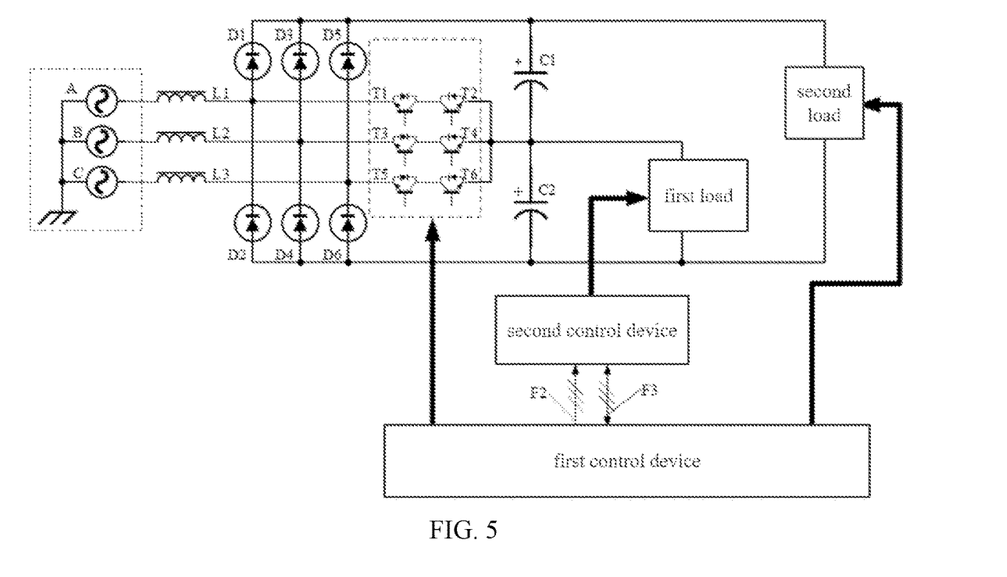
FIG. 5 is a schematic diagram of a circuit connection of another control system according to an embodiment of the present application.

A schematic diagram of the circuit connection between the three-phase three-level power supply circuit, the first control device, the second control device, the first load and the second load may be shown in FIG. 4 or FIG. 5, the first load is connected in parallel with the capacitor C1, the second load is connected in parallel with the capacitors C1 and C2, and the three-phase three-level power supply circuit provides the first load and the second load with the DC voltage. The first control device is used to monitor the three-phase three-level power supply circuit and manage and control the operating parameter of the second load, and control the second control device to control the operating parameter of the first load. FIG. 4 shows only one communication path F1 between the first control device and the second control device, and FIG. 5 shows two communication paths F2 and F3 between the first control device and the second control device. In FIG. 5, it is assumed that the communication path F2 is a dedicated channel for transmitting the first control signal, and the corresponding communication path F3 is configured for transmitting the second control signal that is sent from the first control device to the second control device to control the operating parameter of the first load. In FIGS. 4 and 5, the capacitor C1 is the aforementioned first capacitor and the capacitor C2 is the aforementioned second capacitor.

In this way, the first control signal is sent to the second control device via the target communication channel, which effectively improves the transmission efficiency of the first control signal, and ensures that the second control device can quickly receive the first control signal and respond to the first control signal to control the first load to stop operating, so that the first capacitor will not be over-voltage or damaged.

It should be noted that the description of the same steps and the same contents in this embodiment as in other embodiments can be referred to the description in other embodiments and will not be repeated herein.

In the embodiment of the present application, the first control device determines a first control signal for instructing the first load connected to the three-phase three-level power supply circuit to stop operating when a target-type fault is detected, and sends the first control signal to the second control device via the target communication channel. In this way, the first control device sends the first control signal for instructing the first load to stop operating to the second control device via the target communication channel, so as to cause the second control device to control the first load to stop operating, thereby solving the current problem of unable to quickly and timely control the half-bus load to stop operating when the full-bus load suddenly fails, and realizing a control method of quickly and timely controlling the half-bus load to stop operating, such that the probability of damage of the storage capacitor in the three-phase power supply circuit due to the over-voltage phenomenon is effectively reduced, the control efficiency of the three-phase four-wire power supply circuit is improved, and the fault rate of the power supply control circuit is reduced.

Figure 6:
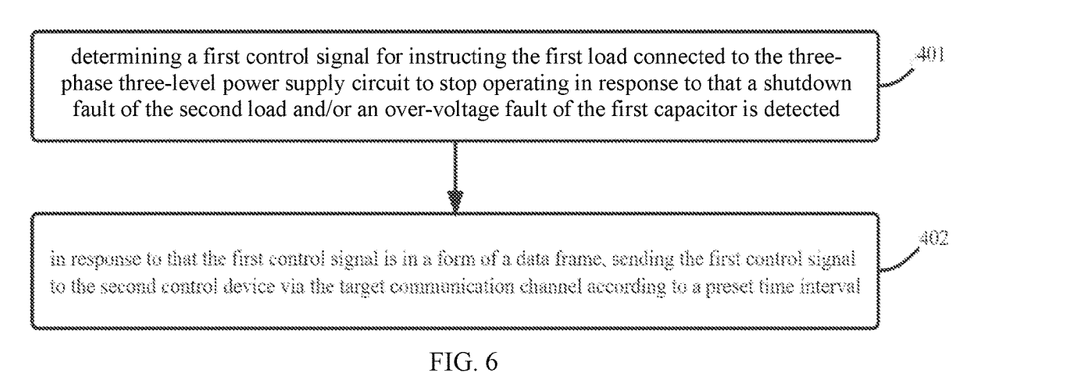
FIG. 6 is a third flowchart of a control method according to an embodiment of the present application.

Based on the foregoing embodiments, the embodiment of the present application provides a control method, as shown in FIG. 6, the method is applied to a first control device for managing a three-phase three-level power supply circuit, a transmission channel for transmitting a second control signal and a target communication channel are included between the first control device and the second control device, and the second control signal is a parameter of the first control device for controlling an operating parameter of a first load, the method includes:

Step 401, determining a first control signal for instructing the first load connected to the three-phase three-level power supply circuit to stop operating in response to that a shutdown fault of the second load and/or an over-voltage fault of the first capacitor is detected.

The first load is connected to one bus of the three-phase three-level power supply circuit, the target-type fault has a correlation with the second load connected to two buses of the three-phase three-level power supply circuit, and the first capacitor is an energy storage capacitor in the three-phase three-level power supply circuit in addition to the second capacitor connected in parallel with the first load.

Step 402: in response to that the first control signal is in a form of a data frame, sending the first control signal to the second control device via the target communication channel according to a preset time interval.

The preset time interval is less than a time period required for which a minimum operating voltage required by the first load is, when the first load is at its maximum, reduced to a minimum voltage permitted by a second capacitor connected in parallel with the first load, the first control signal is configured to instruct the second control device to control the first load to stop operating.

In an embodiment of the present application, based on the schematic diagram of the connection circuit shown in FIG. 5, when there are at least two communication channels F2 and F3 between the first control device and the second control device, the first control signal in the form of the data frame may be sent to the second control device via one target communication channel F2 that is used only for transmitting the first control signal, and the target communication channel F2 transmits the first control signal at a higher frequency. The preset time interval may be an empirical value obtained based on a large number of experiments that is less than the time period required for which the minimum operating voltage required by the first load is, when the first load is maximized, reduced to the minimum voltage permitted by the second capacitor connected in parallel with the first load, or a value obtained by a user based on the time period required for which the minimum operating voltage required for the first load is, when the first load is maximized, reduced to the minimum voltage permitted by the second capacitor connected in parallel with the first load.

Both the first control device and the second control device may be a control chip, which may be, for example, a Microcontroller Unit (MCU).

In other embodiments of the present application, the first control signal may also be one form of: a high and low level signal and a voltage signal form.

In the embodiments of the present application, the form of the first control signal generated by the first control device may be at least one high and low level signal in addition to the form of a data frame, e.g., to illustrate as an example with a high level of 1 and a low level of 0. The first control device outputs a continuous high and low regularly changing level of 1010 to be sent to the second control device via a target communication channel, and the second control device receives the regular change level and immediately controls the first load to stop operating.

The form of the voltage signal may be in the form of a voltage threshold, for example, when the second load, the second capacitor, and the first load are all working normally, the first control device may continuously output a high voltage threshold signal, for example, a voltage signal of 4V, via the target communication channel, and when the first control device detects that there is a shutdown fault of the second load and/or an over-voltage fault of the first capacitor, the first control device turns the voltage signal output from the target communication channel into a low voltage threshold signal, such as a voltage signal of 1V, such that the first load is immediately controlled to stop operating when the second control device receives the voltage signal of 1V.

It should be noted that the target communication channel includes a wired communication channel or a wireless communication channel.

The first control signal may be sent by the first control device to the second control device in the form of a wired form or a wireless signal.

In this way, the use of a separately added target communication channel for transmitting various forms of the first control signal effectively ensures the efficiency of transmitting the first control signal, so that the first control signal can be quickly transmitted to the second control device, and the second control device can quickly control the first load to stop operating, and the first capacitor is effectively protected.

Based on the foregoing embodiment, the embodiment of the present application provides an application embodiment, which includes: a three-level rectifier circuit (namely, the foregoing three-phase three-level power supply circuit), a full-bus load (namely, the foregoing second load), a half-bus load (namely, the foregoing first load), a controller 1 (namely, the foregoing first control device), and a controller 2 (namely, the foregoing second control device); the controller 1 controls the full-bus load and the three-level rectifier circuit, and the controller 2 controls the half-bus load under the control of the controller 1.

The controller 1 and the controller 2 have two communication lines 1 and 2. The communication line 1 is an additional communication line between the controller 1 and the controller 2, i.e. the aforementioned target communication channel. When sending data frames, i.e., the aforementioned first control signal, in the communication line 1, a time difference between adjacent data frames sent is less than a time interval 1; the time interval is less than the time required for the half-bus voltage to fall from the lowest control half-bus voltage to the lowest permissible voltage when the half-bus load is at its maximum.

The communication line 1 is used only for transmitting signals for controlling the on-off of the half-bus load, such as the aforementioned first control signal for controlling the half-bus load to stop operating. The communication line 1 may be comprised of one or more communication lines. The first control signal be comprised of one or a set of high and low levels, or the first control signal may be distinguished by two voltage representations or two voltage thresholds, such as when the first control signal is less than 1V, it indicates that the half-bus load needs to be controlled to stop operating. The communication line 1 may be wireless communication. In some application scenarios, the communication line 2 is used to transmit other information such as speed control, speed feedback, etc. for controlling the half-bus load.

Figure 7:
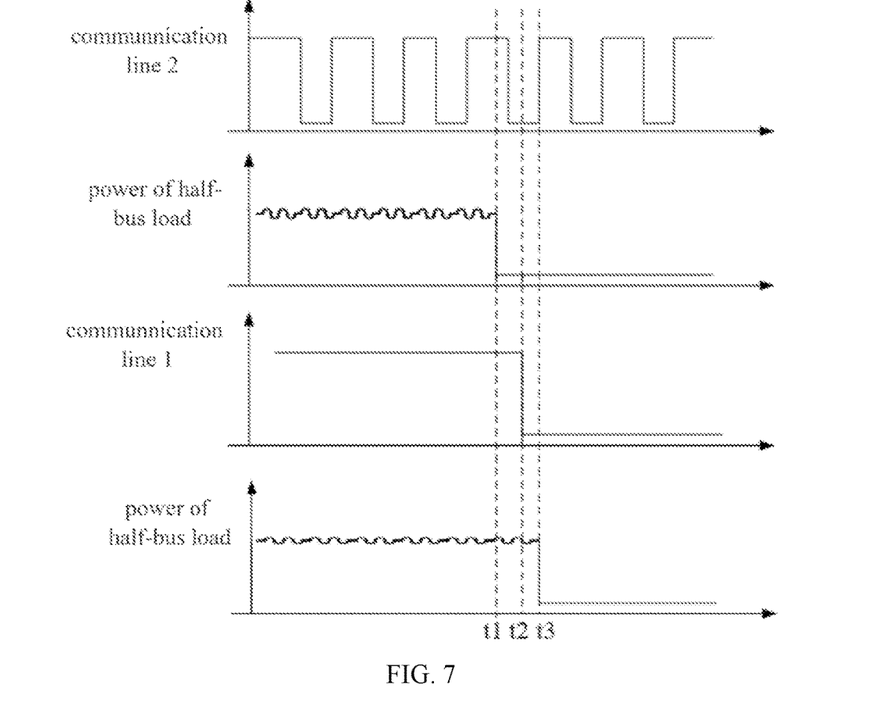
FIG. 7 is a schematic diagram of a timing change according to an embodiment of the present application.

The corresponding work timing diagram between the communication line 1, the communication line 2, the full-bus load, and the half-bus load may be shown as shown in FIG. 7. When the full-bus load has a shutdown fault at the moment t1, the timing of sending the second control signal in the communication line 2 in the first control device does not change in any way, and the first control device generates the first control signal at the moment t2, and at the moment t2, the first control signal is sent to the second control device, and the second control device controls the half-bus load to stop operating when it receives the first control signal at the moment t3.

It should be noted that the description of the same steps and the same contents in this embodiment as in other embodiments can be referred to the description in other embodiments and will not be repeated here.

In the embodiment of the present application, the first control device determines a first control signal for instructing the first load connected to the three-phase three-level power supply circuit to stop operating when a target-type fault is detected, and sends the first control signal to the second control device via the target communication channel. In this way, the first control device sends the first control signal for instructing the first load to stop operating to the second control device via the target communication channel, so as to cause the second control device to control the first load to stop operating, thereby solving the current problem of unable to quickly and timely control the half-bus load to stop operating when the full-bus load suddenly fails, and realizing a control method of quickly and timely controlling the half-bus load to stop operating, such that the probability of damage of the storage capacitor in the three-phase power supply circuit due to the over-voltage phenomenon is effectively reduced, the control efficiency of the three-phase four-wire power supply circuit is improved, and the fault rate of the power supply control circuit is reduced.

Figure 8:
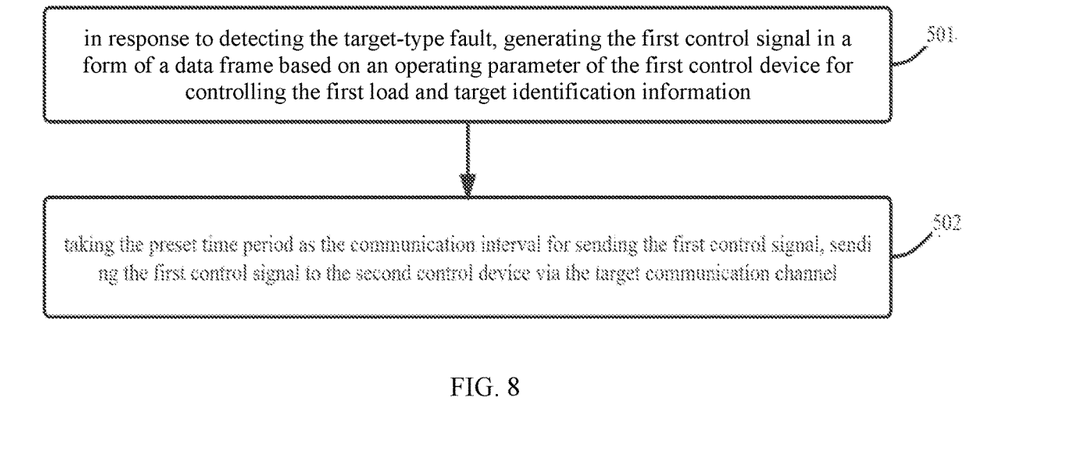
FIG. 8 is a fourth flowchart of a control method according to an embodiment of the present application.

Based on the foregoing embodiments, embodiments of the present application provide a control method, as shown in FIG. 8, the method is applied to manage a first control device of the three-phase three-level power supply circuit, and the target communication channel is also used to transmit an operating parameter of the first control device for controlling a first load, the method includes:

Step 501, in response to detecting the target-type fault, generating the first control signal in a form of a data frame based on an operating parameter of the first control device for controlling the first load and target identification information.

The target identification information is used to instruct the second control device to control the second load to stop operating, and the target-type fault includes at least one of: a shutdown fault of the second load and an over-voltage fault of the first capacitor. The first capacitor is an energy storage capacitor in the three-phase three-level power supply circuit in addition to the second capacitor that is connected in parallel with the first load.

In an embodiment of the present application, based on the schematic diagram of the circuit connection shown in FIG. 4, when there is only one communication channel F1 for communication between the first control device and the second control device, and the communication between the first control device and the second control device is carried out via data frames, if the first control device determines that neither the second load nor the first capacitor has a fault, i.e., they are working normally, the first control device generates a second control signal based on the operating parameter that controls the first load, and sends the second control signal to the second control device via the target communication channel according to a certain frequency of sending data frames, so that the second control device controls the operating parameter of the first load based on the operating parameters indicated by the second control signal. If the first control device detects a shutdown fault of the second load and/or an over-voltage fault of the first capacitor, the first control device generates the first control signal in the form of a data frame based on the operating parameter of the first load and the target identification information, which can be achieved specifically by that the first control device generates the second control signal based on the operating parameter of the first load, and adds the target identification information to a header or other position of the data frame of the second control signal to send the target identification information to the second control device.

Step 502: taking the preset time period as the communication interval for sending the first control signal, sending the first control signal to the second control device via the target communication channel.

The preset time period is less than a time period required for which a minimum operating voltage required by the first load is, when the first load is at its maximum, reduced to a minimum voltage permitted by a second capacitor connected in parallel with the first load, the first control signal is used to instruct the second control device to control the first load to stop operating.

In an embodiment of the present application, the preset period is an empirical value obtained based on a large number of experiments that is less than the time period required for which the minimum operating voltage required by the first load is, when the first load is at its maximum, reduced to the minimum voltage permitted by the second capacitor connected in parallel with the first load, and the preset period may also be a value of time determined by the user based on which the minimum operating voltage required by the first load is, when the first load is at its maximum, reduced to the minimum voltage permitted by the second capacitor connected in parallel with the first load.

The preset time period is less than the sending interval for the first control device to send the second control signal, so that the first control device can quickly send the first control signal to the second control device to enable the second control device to quickly control the first load to stop operating, and the voltage between the first capacitor and the second capacitor is balanced before the second capacitor becomes over-voltage or damaged.

It should be noted that the target communication channel includes a wired communication channel or a wireless communication channel.

In this way, the first control signal can be quickly transmitted to the second control device by the target communication channel and the reduction of the transmission interval, so that the second control device can quickly control the first load to stop operating, the first capacitor is effectively protected.

Based on the foregoing embodiment, embodiments of the present application provide an application embodiment, which includes: a three-level rectifier circuit (namely, the foregoing three-phase three-level power supply circuit), a full-bus load (namely, the foregoing second load), a half-bus load (namely, the foregoing first load), a controller 1 (namely, the foregoing first control device), and a controller 2 (namely, the foregoing second control device); the controller 1 controls the full-bus load and the three-level rectifier circuit, and the controller 2 controls the half-bus load under the control of the controller 1.

There is only one communication line 3 between the controller 1 and the controller 2. In this way, indication information for indicating the half-bus load to stop operating, i.e. the aforementioned target identification information, is embedded at the header or other position of each signal frame for instructing the operating parameter of the first load, i.e. the aforementioned second control signal, so as to obtain the aforementioned first control signal. The controller 1 sends the first control signal to the controller 2 via the communication line 3 by a high baud rate and a short communication frame interval, so that the time for the controller 1 to send the longest frame is less than the time required for the half-bus voltage to fall from the lowest control half-bus voltage to the lowest permissible voltage when the half-bus load is at its maximum.

It should be noted that the description of the same steps and the same contents in this embodiment as in other embodiments can be referred to the description in other embodiments and will not be repeated here.

In the embodiment of the present application, the first control device determines a first control signal for instructing the first load connected to the three-phase three-level power supply circuit to stop operating when a target-type fault is detected, and sends the first control signal to the second control device via the target communication channel. In this way, the first control device sends the first control signal for instructing the first load to stop operating to the second control device via the target communication channel, so as to cause the second control device to control the first load to stop operating, thereby solving the current problem of unable to quickly and timely control the half-bus load to stop operating when the full-bus load suddenly fails, and realizing a control method of quickly and timely controlling the half-bus load to stop operating, such that the probability of damage of the storage capacitor in the three-phase power supply circuit due to the over-voltage phenomenon is effectively reduced, the control efficiency of the three-phase four-wire power supply circuit is improved, and the fault rate of the power supply control circuit is reduced.

Figure 9:
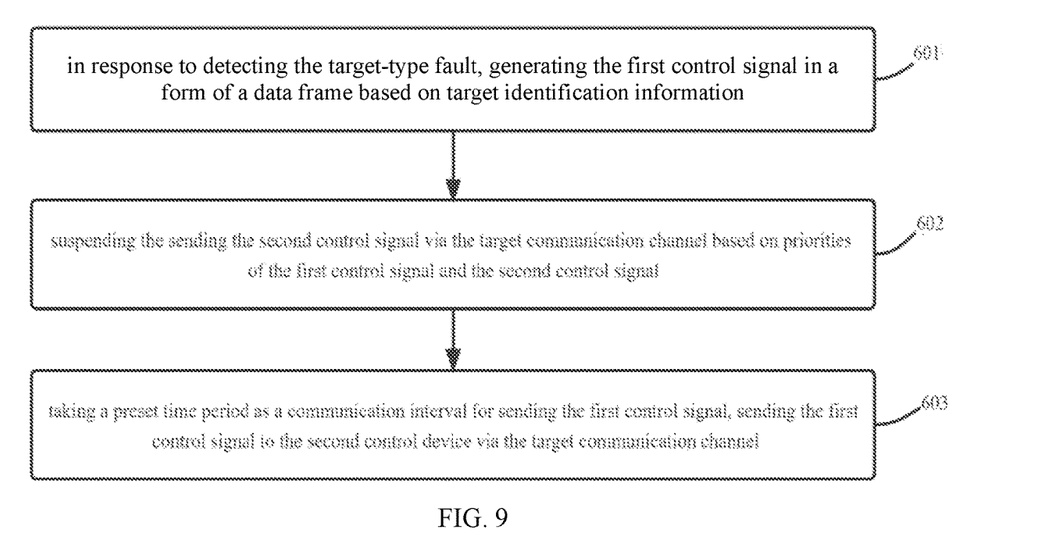
FIG. 9 is a fifth flowchart of a control method according to an embodiment of the present application.

Based on the foregoing embodiments, embodiments of the present application provide a control method, as shown in FIG. 9, the method is applied to a first control device that manages a three-phase three-level power supply circuit, and the target communication channel is also used to transmit an operating parameter of the first control device for controlling a first load, and the method includes:

Step 601, in response to detecting the target-type fault, generating the first control signal in a form of a data frame based on target identification information.

The target identification information is used to instruct the second control device to control the second load to stop operating, the target-type fault includes at least one of: a shutdown fault of the second load and an over-voltage fault of the first capacitor, the first capacitor is an energy storage capacitor in the three-phase three-level power supply circuit in addition to the second capacitor connected in parallel with the first load.

In an embodiment of the present application, based on the schematic diagram of the circuit connection shown in FIG. 4, when there is only one communication channel F1 for communication between the first control device and the second control device and the communication between the first control device and the second control device is carried out via data frames, if the first control device determines that neither the second load nor the first capacitor has a fault, i.e., they are working normally, the first control device generates a second control signal based on the operating parameter of the first load, and sends the second control signal to the second control device via a target communication channel according to a certain frequency of sending data frames, so that the second control device controls the operating parameter of the first load based on the operating parameter indicated by the second control signal. If the first control device detects a shutdown fault of the second load and/or an over-voltage fault of the first capacitor, the first control device generates, based on the target identification information, the first control signal having only the target identification information, i.e., the first control device generates a separate control signal for instructing the second control device to control the first load to stop operating.

Step 602, suspending the sending the second control signal via the target communication channel based on priorities of the first control signal and the second control signal.

The sending priority of the first control signal is higher than the sending priority of the second control signal.

In an embodiment of the present application, the sending priority of the first control signal is set to the highest, and when the first control device generates the first control signal, the second control signal sent via the target communication channel is suspended due to the highest priority of the first control signal.

Step 603: taking a preset time period as a communication interval for sending the first control signal, sending the first control signal to the second control device via the target communication channel.

The preset time interval is less than a time period required for which a minimum operating voltage required by the first load is, when the first load is at its maximum, reduced to a minimum voltage permitted by a second capacitor connected in parallel with the first load, the first control signal is used to instruct the second control device to control the first load to stop operating.

In an embodiment of the present application, after the first control device suspends sending the second control signal, it sends the first control signal to the second control device via the target communication channel according to a preset time period communication interval.

It should be noted that the target communication channel includes a wired communication channel or a wireless communication channel.

In this way, the first control signal can be quickly transmitted to the second control device by the target communication channel and the reduction of the transmission interval, so that the second control device can quickly control the first load to stop operating, the first capacitor is effectively protected.

Based on the foregoing embodiment, embodiments of the present application provide an application embodiment, which includes: a three-level rectifier circuit (namely, the foregoing three-phase three-level power supply circuit), a full-bus load (namely, the foregoing second load), a half-bus load (namely, the foregoing first load), a controller 1 (namely, the foregoing first control device), and a controller 2 (namely, the foregoing second control device); the controller 1 controls the full-bus load and the three-level rectifier circuit, and the controller 2 controls the half-bus load under the control of the controller 1.

There is only one communication line 3 between the controller 1 and the controller 2. In this way, indication information for indicating the half-bus load to stop operating, i.e. the aforementioned target identification information, is embedded at the header or other position of each signal frame for instructing the operating parameter of the first load, i.e. the aforementioned second control signal, so as to obtain the aforementioned first control signal. The controller 1 sends the first control signal to the controller 2 via the communication line 3 by a high baud rate and a short communication frame interval, so that the time for the controller 1 to send the longest frame is less than the time required for the half-bus voltage to fall from the lowest control half-bus voltage to the lowest permissible voltage when the half-bus load is at its maximum.

It should be noted that the description of the same steps and the same contents in this embodiment as in other embodiments can be referred to the description in other embodiments and will not be repeated here.

In the embodiment of the present application, the first control device determines a first control signal for instructing the first load connected to the three-phase three-level power supply circuit to stop operating when a target-type fault is detected, and sends the first control signal to the second control device via the target communication channel. In this way, the first control device sends the first control signal for instructing the first load to stop operating to the second control device via the target communication channel, so as to cause the second control device to control the first load to stop operating, thereby solving the current problem of unable to quickly and timely control the half-bus load to stop operating when the full-bus load suddenly fails, and realizing a control method of quickly and timely controlling the half-bus load to stop operating, such that the probability of damage of the storage capacitor in the three-phase power supply circuit due to the over-voltage phenomenon is effectively reduced, the control efficiency of the three-phase four-wire power supply circuit is improved, and the fault rate of the power supply control circuit is reduced.

Figure 10:
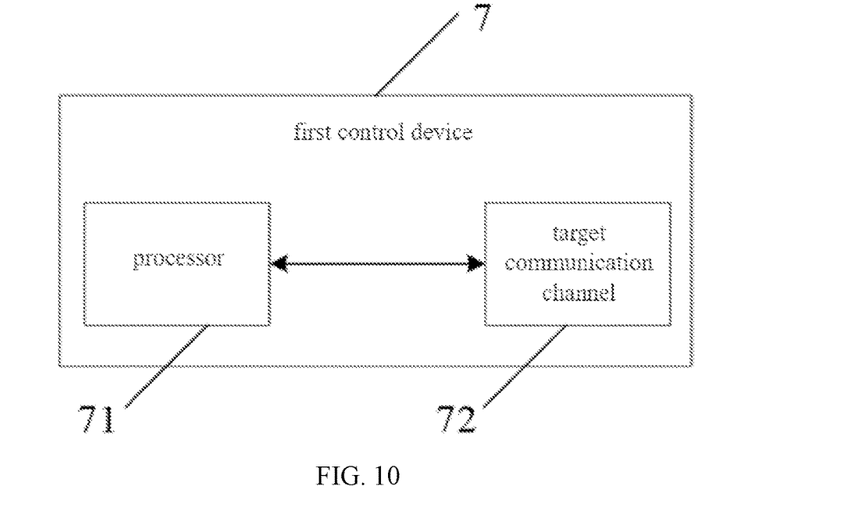
FIG. 10 is a schematic structural diagram of a first control device according to an embodiment of the present application.

Based on the foregoing embodiments, embodiments of the present application provide a first control device, as shown in FIG. 10, the first control device 7 may include: a processor 71 and a target communication channel 72.

The processor 71 is configured for in response to detecting a target-type fault, determining a first control signal for instructing a first load connected to the three-phase three-level power supply circuit to stop operating; the first load is connected to one bus of the three-phase three-level power supply circuit, and the target-type fault has a correlation with a second load connected to two buses of the three-phase three-level power supply circuit.

The target communication channel 72 is configured for communicating with a second control device to transmit the first control signal to the second control device; the first control signal is configured to instruct the second control device to control the second load to stop operating.

In other embodiments of the present application, the target-type fault includes at least one of: a shutdown fault of the second load and an over-voltage fault of the first capacitor; the first capacitor is an energy storage capacitor in the three-phase three-level power supply circuit in addition to the second capacitor connected in parallel with the first load.

In other embodiments of the present application, a transmission channel for transmitting a second control signal and a target communication channel are included between the first control device and the second control device, the second control signal includes an operating parameter of the first control device for controlling the first load, and the processor performs the step of sending the first control signal to the second control device via the target communication channel:
  in response to that the first control signal is in a form of a data frame, sending the first control signal to the second control device via the target communication channel according to a preset time interval; the preset time interval is less than a time period required for which a minimum operating voltage required by the first load is, when the first load is at its maximum, reduced to a minimum voltage permitted by a second capacitor connected in parallel with the first load.

In other embodiments of the present application, the first control device and the second control device include a transmission channel and a target communication channel for transmitting the second control signal, the second control signal includes an operating parameter of the first control device for controlling the first load, and the first control signal is further in one form of: a high and low level signal and a voltage signal form.

In other embodiments of the present application, the processor performing the step of determining the first control signal for instructing the first load connected to the three-phase three-level power supply circuit to stop operating in response to detecting a target-type fault, which may be realized by the following steps:
  in response to detecting the target-type fault, generating the first control signal in a form of a data frame based on an operating parameter of the first control device for controlling the first load and target identification information; the target identification information is configured to instruct the second control device to control the second load to stop operating;
  correspondingly, the target communication channel is also configured for transmitting the operating parameter of the first control device for controlling the first load, the sending the first control signal to the second control device via the target communication channel includes:
  taking a preset time period as a communication interval for sending the first control signal, sending the first control signal to the second control device via the target communication channel.

In other embodiments of the present application, when the processor performs the step of determining the first control signal for instructing the first load connected to the three-phase three-level power supply circuit to stop operating in response to detecting the target-type fault, which may be realized by the following steps:
  in response to detecting the target-type fault, generating the first control signal in a form of a data frame based on target identification information; the target identification information is configured to instruct the second control device to control the second load to stop operating;
  correspondingly, the target communication channel is also configured for transmitting an operating parameter of the first control device for controlling the first load, the sending the first control signal to the second control device via the target communication channel includes:
  suspending the sending the second control signal via the target communication channel based on priorities of the first control signal and the second control signal; a sending priority of the first control signal is higher than a sending priority of the second control signal; and
  taking a preset time period as a communication interval for sending the first control signal, sending the first control signal to the second control device via the target communication channel.

In other embodiments of the present application, the preset time period is less than a time period required for which a minimum operating voltage required by the first load is, when the first load is at its maximum, reduced to a minimum voltage permitted by a second capacitor connected in parallel with the first load.

In other embodiments of the present application, the target communication channel includes a wired communication channel or a wireless communication channel.

It should be noted that the specific realization process of the information interaction between the unit and the module in the present embodiment can be referred to the realization process in the control method provided in the corresponding embodiments of FIGS. 1~2, FIG. 6, and FIGS. 8~9, and will not be repeated herein.

In the embodiment of the present application, the first control device determines a first control signal for instructing the first load connected to the three-phase three-level power supply circuit to stop operating when a target-type fault is detected, and sends the first control signal to the second control device via the target communication channel. In this way, the first control device sends the first control signal for instructing the first load to stop operating to the second control device via the target communication channel, so as to cause the second control device to control the first load to stop operating, thereby solving the current problem of unable to quickly and timely control the half-bus load to stop operating when the full-bus load suddenly fails, and realizing a control method of quickly and timely controlling the half-bus load to stop operating, such that the probability of damage of the storage capacitor in the three-phase power supply circuit due to the over-voltage phenomenon is effectively reduced, the control efficiency of the three-phase four-wire power supply circuit is improved, and the fault rate of the power supply control circuit is reduced.

Figure 11:
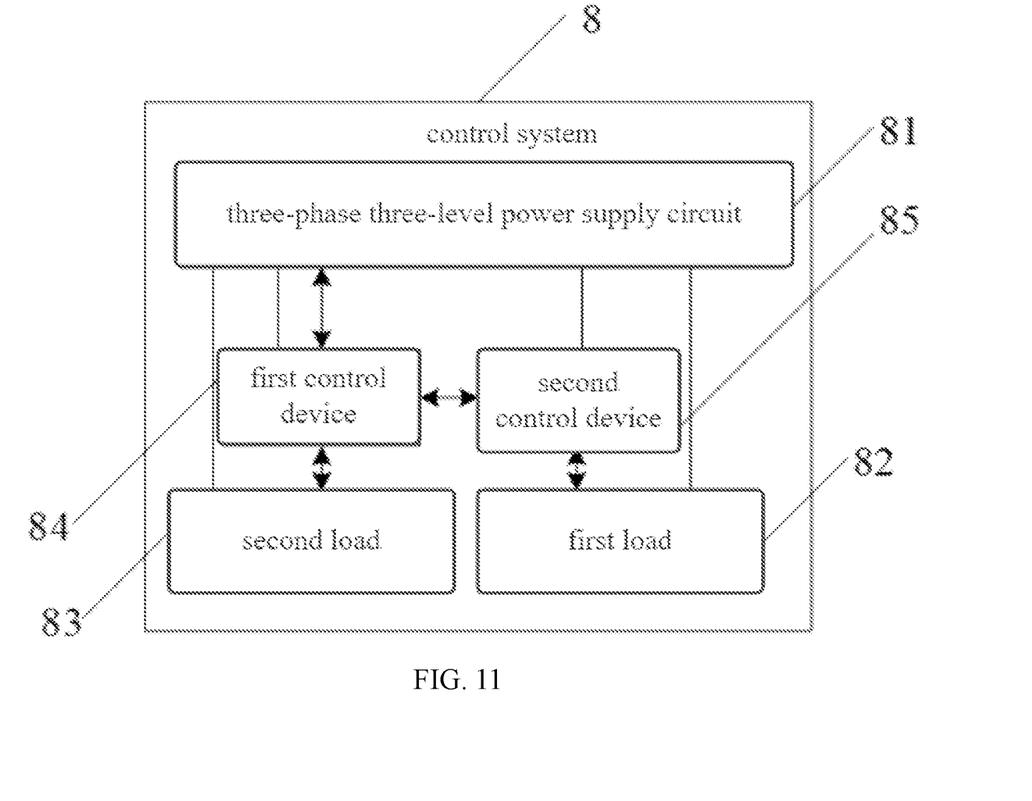
FIG. 11 is a schematic structural diagram of a control system according to an embodiment of the present application.

Based on the foregoing embodiments, embodiments of the present application provide a control system, as shown in FIG. 11, the control system 8 may include: a three-phase three-level power supply circuit 81, a first load 82, a second load 83, a first control device 84, and a second control device 85.

The three-phase three-level power supply circuit 81 is configured to rectify the input AC electric signal to obtain a DC electric signal, and to provide an operating power supply for the first load 82 connected to one bus of the three-phase three-level power supply circuit, the second load 83 connected to two buses of the three-phase three-level power supply circuit, the first control device 84, and the second control device 85.

The first control device 84 is configured to monitor the three-phase three-level power supply circuit and the first load, to realize the process of the method as shown in FIGS. 1~2, FIG. 6, and FIGS. 8~9, which will not be described in detail herein.

A second control device 85 configured for managing and controlling the second load.

The first control device 84 is the same device as the aforementioned first control device 7. The second control device 85 is usually under the control of the first control device 84 for performing management control of the second load.

It is to be noted that the schematic diagram of the circuit connection structure between the devices in the control system can be referred to the schematic diagram of the circuit connections shown in FIGS. 4 and 5, and will not be repeated in detail herein.

Based on the foregoing embodiments, embodiments of the present application provide an air-conditioning device, the air-conditioning device is an air-conditioner including the control system shown in FIG. 11, the first load is a DC fan load and the second load is a compressor load, which will not be described in detail herein.

Exemplarily, it is assumed that the second load, i.e., the compressor load, and the first load, i.e., the DC fan load, are operated simultaneously in the three-phase three-level power supply circuit of the air conditioning device. The compressor load is operated with a power of 3,000 watts (W), and the DC fan load is operated with a power of 100 W. Since the power consumed by the DC fan load is much smaller compared to the power consumed by the compressor load. Therefore, in the case where the full-bus voltage supplies power to the main load, i.e., the compressor load, and the lower half-bus supplies power to the small load, i.e., the DC fan, the electrolytic capacitors C1 and C2 can both provide a power of 1,650 W. The upper half-bus capacitor, i.e., the electrolytic capacitor C1, can supply power of 1,650 W to the compressor load, and the lower half-bus capacitor C2 can supply power of 1,550 W to the main load, i.e., the compressor load, while supplying power of 1,050 W to the DC fan load, at this time, a difference between the supply powers of the electrolytic capacitors C1 and C2 is smaller, the mid-point potential between the electrolytic capacitors C1 and C2 balances, the their respective voltages of the electrolytic capacitors C1 and C2 are also in their corresponding withstand voltage range. However, when the compressor load faults and does not consume power, only the DC fan load consumes power of 100 W in the entire working circuit, resulting in that the voltage across two ends of a large capacitor equivalent to the electrolytic capacitors C1 and C2 reaches 650V due to the voltage output by the three-level rectifier module, while the electrolytic capacitors C1 and C2 are voltage-sharing via series connection, so that when the compressor load faults, in the working circuit, only DC fan load quickly consumes energy, so that the lower half-bus capacitor C2 power is quickly consumed, but the voltage of two ends of a large capacitor equivalent to the electrolytic capacitors C1 and C2 keeps constant, resulting in a rapid rise of voltage of the upper half-bus electrolytic capacitor C1, and resulting in the voltage of the electrolytic capacitor C1 is likely to exceed the value of its voltage tolerance, which further leads to the electrolytic capacitor C1 blowing up to form a serious accident.

In this way, after the first control device determines that the second load has stopped operation, it informs the second controller via the target communication channel that the second load has stopped operation and that the first load needs to be controlled to stop operating immediately, so that there is no load on both the upper half-bus and the lower half-bus, and the electrolytic capacitors C1 and C2 share the full-bus voltage equally, thereby ensuring that the electrolytic capacitors C1 will not be damaged. Due to the use of the target communication channel and the fast communication speed of the target communication channel, the master control responds in a timely manner, thereby ensuring that the capacitors are protected from damage.

Based on the foregoing embodiments, embodiments of the present application provide a computer-readable storage medium, referred to as a storage medium, which stores one or more programs, which can be executed by one or more processors to realize the control method provided by embodiments corresponding to FIGS. 1~2, 6, and 8~9, which will not be repeated herein.

The above, which are only embodiments of the present application, are not intended to limit the scope of the present application. Any modifications, equivalent substitutions and improvements made within the scope of the present application are included in the scope of the present application.

Industrial Utility

Embodiments of the present application provide a control method device, system, and storage medium, the method includes: in response to detecting a target-type fault, determining a first control signal for instructing a first load connected to the three-phase three-level power supply circuit to stop operating; the first load is connected to one bus of the three-phase three-level power supply circuit, and the target-type fault has a correlation with a second load connected to two buses of the three-phase three-level power supply circuit; sending the first control signal to a second control device via a target communication channel; the first control signal is configured to instruct the second control device to control the first load to stop operating. The first control device sends the first control signal for instructing the first load to stop operating to the second control device via the target communication channel, so as to cause the second control device to control the first load to stop operating, thereby solving the current problem of unable to quickly and timely control the half-bus load to stop operating when the full-bus load suddenly fails, and realizing a control method of quickly and timely controlling the half-bus load to stop operating, such that the probability of damage of the storage capacitor in the three-phase power supply circuit due to the over-voltage phenomenon is effectively reduced, the control efficiency of the three-phase four-wire power supply circuit is improved, and the fault rate of the power supply control circuit is reduced.

What is claimed is:

1. A control method comprising:
   in response to detecting a target-type fault, determining, by a first control device managing a three-phase three-level power supply circuit, a control signal for instructing a first load to stop operating, the first load being connected to one of buses of the three-phase three-level power supply circuit, and the target-type fault being correlated with a second load connected to two of the buses of the three-phase three-level power supply circuit; and sending the control signal to a second control device via a target communication channel, to instruct the second control device to control the first load to stop operating.

2. The method according to claim 1, wherein:
the target-type fault includes at least one of a shutdown fault of the second load or an over-voltage fault of a first capacitor; and
the first capacitor is an energy storage capacitor in the three-phase three-level power supply circuit other than a second capacitor connected in parallel with the first load.

3. The method according to claim 1, wherein:
the control signal is a first control signal;
the three-phase three-level power supply circuit includes:
  a first capacitor; and
  a second capacitor connected in parallel with the first load;
a transmission channel for transmitting a second control signal and the target communication channel exist between the first control device and the second control device, the second control signal including an operating parameter of the first control device for controlling the first load; and
sending the first control signal to the second control device via the target communication channel includes:
  in response to that the first control signal is in a form of data frame, sending the first control signal to the second control device via the target communication channel according to a preset time interval, the preset time interval being shorter than a time period required for a minimum operating voltage required by the first load to be, when the first load is at maximum, reduced to a minimum voltage permitted by the second capacitor.

4. The method according to claim 1, wherein:
the control signal is a first control signal including a high and low level signal or a voltage signal; and
a transmission channel for transmitting a second control signal and the target communication channel exist between the first control device and the second control device, the second control signal including an operating parameter of the first control device for controlling the first load.

5. The method according to claim 1, wherein:
determining the control signal for instructing the first load to stop operating includes:
  generating the control signal in a form of data frame based on an operating parameter of the first control device for controlling the first load and target identification information, the target identification information being configured to instruct the second control device to control the second load to stop operating;
the target communication channel is further configured to transmit the operating parameter of the first control device for controlling the first load; and
sending the control signal to the second control device via the target communication channel includes:
  sending the control signal to the second control device via the target communication channel using a preset time period as a communication interval.

6. The method according to claim 5, wherein:
the three-phase three-level power supply circuit includes:
  a first capacitor; and
  a second capacitor connected in parallel with the first load; and the preset time period is shorter than a time period required for a minimum operating voltage required by the first load to be, when the first load is at maximum, reduced to a minimum voltage permitted by the second capacitor.

7. The method according to claim 1, wherein:
the control signal is a first control signal;
determining the first control signal for instructing the first load to stop operating includes:
  generating the first control signal in a form of data frame based on target identification information, the target identification information being configured to instruct the second control device to control the second load to stop operating;
the target communication channel is further configured to transmit an operating parameter of the first control device for controlling the first load; and
sending the first control signal to the second control device via the target communication channel includes:
  suspending sending a second control signal via the target communication channel based on priorities of the first control signal and the second control signal, a sending priority of the first control signal being higher than a sending priority of the second control signal; and
  sending the first control signal to the second control device via the target communication channel using a preset time period as a communication interval.

8. The method according to claim 7, wherein:
the three-phase three-level power supply circuit includes:
  a first capacitor; and
  a second capacitor connected in parallel with the first load; and
the preset time period is shorter than a time period required for a minimum operating voltage required by the first load to be, when the first load is at maximum, reduced to a minimum voltage permitted by the second capacitor.

9. The method according to claim 1, wherein the target communication channel includes a wired communication channel or a wireless communication channel.

10. A storage medium storing a control program that, when executed by a processor, causes the processor to perform the method according to claim 1.

11. A first control device comprising:
a processor configured to, in response to detecting a target-type fault, determine a control signal for instructing a first load to stop operating, the first load being connected to one of buses of a three-phase three-level power supply circuit, and the target-type fault being correlated with a second load connected to two of the buses of the three-phase three-level power supply circuit; and
a target communication channel configured to communicate with a second device to transmit the control signal to the second control device, to instruct the second control device to control the first load to stop operating.

12. The first control device according to claim 11, wherein:
the target-type fault includes at least one of a shutdown fault of the second load or an over-voltage fault of a first capacitor; and
the first capacitor is an energy storage capacitor in the three-phase three-level power supply circuit other than a second capacitor connected in parallel with the first load.

13. The first control device according to according to claim 11, wherein:
the control signal is a first control signal;
the three-phase three-level power supply circuit includes:
a first capacitor; and
a second capacitor connected in parallel with the first load;
a transmission channel for transmitting a second control signal and the target communication channel exist between the first control device and the second control device, the second control signal including an operating parameter of the first control device for controlling the first load; and
the processor is further configured to:
in response to that the first control signal is in a form of data frame, send the first control signal to the second control device via the target communication channel according to a preset time interval, the preset time interval being shorter than a time period required for a minimum operating voltage required by the first load to be, when the first load is at maximum, reduced to a minimum voltage permitted by the second capacitor.

14. The first control device according to according to claim 11, wherein:
the control signal is a first control signal including a high and low level signal or a voltage signal; and
a transmission channel for transmitting a second control signal and the target communication channel exist between the first control device and the second control device, the second control signal including an operating parameter of the first control device for controlling the first load.

15. The first control device according to according to claim 11, wherein:
the processor is further configured to:
generate the control signal in a form of data frame based on an operating parameter of the first control device for controlling the first load and target identification information, the target identification information being configured to instruct the second control device to control the second load to stop operating;
the target communication channel is further configured to:
transmit the operating parameter of the first control device for controlling the first load; and
transmit the control signal to the second control device using a preset time period as a communication interval.

16. The first control device according to according to claim 15, wherein:
the three-phase three-level power supply circuit includes:
a first capacitor; and
a second capacitor connected in parallel with the first load; and
the preset time period is shorter than a time period required for a minimum operating voltage required by the first load to be, when the first load is at maximum, reduced to a minimum voltage permitted by the second capacitor.

17. The first control device according to according to claim 11, wherein:
the control signal is a first control signal;
the processor is further configured to:
generating the first control signal in a form of data frame based on target identification information, the target identification information being configured to instruct the second control device to control the second load to stop operating; and
the target communication channel is further configured to:
transmit an operating parameter of the first control device for controlling the first load;
suspend transmitting a second control signal based on priorities of the first control signal and the second control signal, a sending priority of the first control signal being higher than a sending priority of the second control signal; and
transmit the first control signal to the second control device using a preset time period as a communication interval.

18. The first control device according to according to claim 17, wherein:
the three-phase three-level power supply circuit includes:
a first capacitor; and
a second capacitor connected in parallel with the first load; and
the preset time period is shorter than a time period required for a minimum operating voltage required by the first load to be, when the first load is at maximum, reduced to a minimum voltage permitted by the second capacitor.

19. A control system comprising:
a three-phase three-level power supply circuit including busses;
a first load connected to one of the buses;
a second load connected to two of the buses;
a first control device; and
a second control device;
wherein:
the three-phase three-level power supply circuit is configured to rectify an input alternating current signal to obtain a direct current signal and provide a working power supply for the first load, the second load, the first control device, and the second control device;
the first control device is configured to:
in response to detecting a target-type fault, determine a control signal for instructing the first load to stop operating, the target-type fault being correlated with the second load; and
send the control signal to the second control device via a target communication channel, to instruct the second control device to control the first load to stop operating; and
the second control device is further configured to manage and control the second load.

20. An air conditioning device comprising:
the control system according to claim 19;
wherein the first load is a direct current fan load and the second load is a compressor load.

* * * * *